United States Patent
Li et al.

(10) Patent No.: US 10,976,484 B2
(45) Date of Patent: Apr. 13, 2021

(54) FRAME STRUCTURE, BACKLIGHT ASSEMBLY AND DISPLAY DEVICE

(71) Applicants: BEIJING BOE CHATANI ELECTRONICS CO., LTD., Beijing (CN); BOE TECHNOLOGY GROUP CO., LTD., Beijing (CN)

(72) Inventors: Qilin Li, Beijing (CN); Ting Li, Beijing (CN)

(73) Assignees: BEIJING BOE CHATANI ELECTRONICS CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/447,754

(22) Filed: Jun. 20, 2019

(65) Prior Publication Data
US 2020/0132921 A1 Apr. 30, 2020

(30) Foreign Application Priority Data
Oct. 31, 2018 (CN) .......................... 201821790804.6

(51) Int. Cl.
*F21V 8/00* (2006.01)
(52) U.S. Cl.
CPC .................................. *G02B 6/0088* (2013.01)
(58) Field of Classification Search
CPC ............................ G02B 6/0081; G02B 6/0088
USPC ............ 362/97.1–97.4, 632–634; 349/58–60
See application file for complete search history.

(56) References Cited

U.S. PATENT DOCUMENTS 7,106,393 B2 * 9/2006 Lee ...................... G02B 6/0088
349/58

* cited by examiner

*Primary Examiner* — Jason M Han (57) ABSTRACT

Embodiments of the present disclosure provide a frame structure, a backlight assembly, and a display device. The frame structure includes: a frame including an annular bottom and a sidewall surrounding the annular bottom, the annular bottom has a protrusion disposed in parallel with the sidewall; and a matching plate having a first hollow portion, the first hollow portion is configured to be engaged with the protrusion.

18 Claims, 9 Drawing Sheets

FRAME STRUCTURE, BACKLIGHT ASSEMBLY AND DISPLAY DEVICE

TECHNICAL FIELD

At least one embodiment of the present disclosure relates to a frame structure, a backlight assembly and a display device.

BACKGROUND

With the increasingly mature liquid crystal display technology, liquid crystal display device is more and more favored by users. The liquid crystal display device usually includes a backlight assembly and a display panel. By applying a voltage to the display panel, an electric field is formed in the display panel to drive liquid crystal molecules to rotate, so as to control transmission or shielding of light emitted from the backlight assembly, thereby realizing image display.

However, the existing backlight assembly, the frame structure for forming the backlight assembly, and the display device including the backlight assembly are still to be improved.

SUMMARY

A first aspect of the present disclosure provides a frame structure, the frame structure includes: a frame including an annular bottom and a sidewall surrounding the annular bottom, the annular bottom has a protrusion disposed in parallel with the sidewall; and a matching plate having a first hollow portion, the first hollow portion is configured to be engaged with the protrusion.

A second aspect of the present disclosure provides a backlight assembly including the frame structure according to the first aspect.

A third aspect of the present disclosure provides a display device including the backlight assembly according to the second aspect.

BRIEF DESCRIPTION OF THE DRAWINGS

In order to clearly illustrate the technical solutions of the embodiments of the present disclosure, the drawings of the embodiments will be briefly described in the following. Apparently, the described embodiments are just a part but not all of the embodiments of the present disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1A:
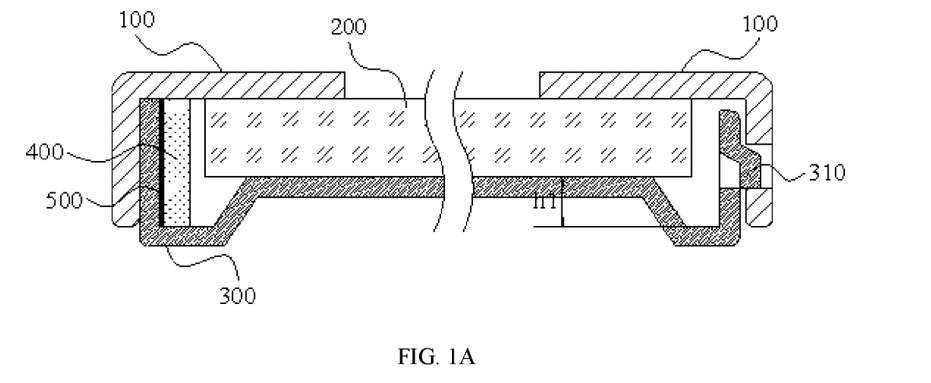
FIG. 1A and FIG. 1B are schematic structural views of a backlight assembly.
Figure 1B:
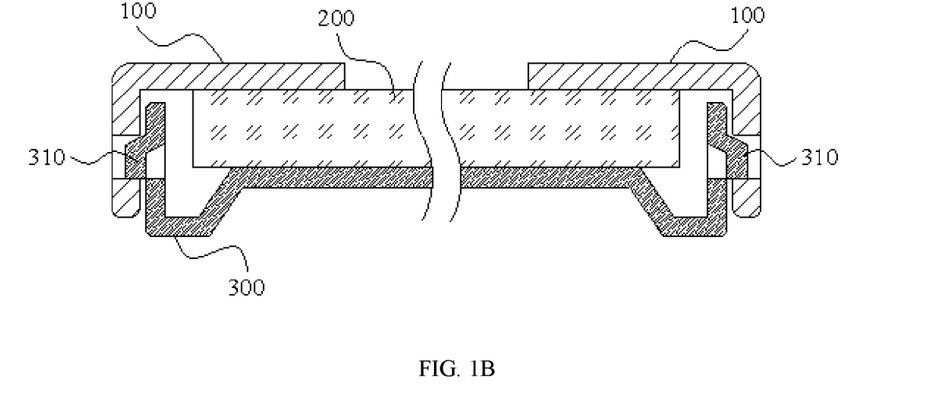

FIG. 1A and FIG. 1B illustrate a backlight assembly, in which FIG. 1A is a lateral cross-sectional view of the backlight assembly, and FIG. 1B is a front cross-sectional view of the backlight assembly. Referring to FIG. 1, the backlight assembly includes a frame 100, an optical film unit 200, a back plate 300, and a light bar 400. The optical film unit 200 and the light bar 400 are both disposed in an accommodating space defined by the frame 100 and the back plate 300, and the light bar 400 is attached to a sidewall of the back plate 300 by a fixing tape 500. The above backlight assembly mainly has the following drawbacks.

Firstly, the back plate 300 is usually formed of a galvanized steel sheet (EGI) with a density of about 7.85 g/cm3. For a back plate in 23.8-inch specification, by way of example, the specific size is generally 53 cm×31 cm×0.08 cm, and hence the weight is about M=53×31×0.08×7.85=1031 g, which is relatively large. Because the weight of the back plate 300 accounts for a large proportion of the overall weight of the backlight assembly, the backlight assembly is generally heavy.

Secondly, the back plate 300 has a matching structure 310 to be engaged with the frame 100. Due to the presence of the matching structure 310, an area of the back plate 300 corresponding to the optical film unit 200 needs to be arched toward the optical film unit 200 to ensure the flatness of the optical film unit 200 and also to support the optical film unit 200. Therefore, the overall thickness of the backlight assembly includes not only the thickness of the frame 100, the thickness of the optical film unit 200, and the thickness of the back plate 300, but also includes the distance that the back plate 300 is arched (e.g., h1 as illustrated in FIG. 1A). As a result, the overall thickness of the backlight assembly is relatively large.

Figure 2A:
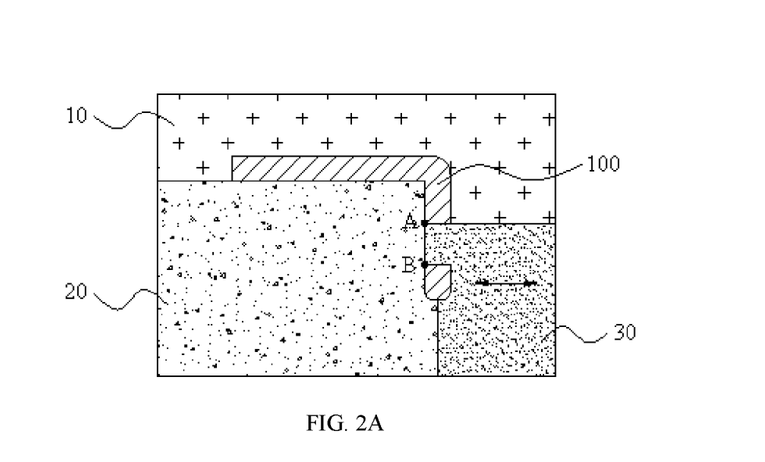
FIG. 2A and FIG. 2B are schematic diagrams illustrating the backlight assembly of FIG. 1 generating debris.

Finally, referring to FIG. 2A, the frame 100 is formed by injection molding. Because the frame 100 has a hollow portion in a region where the matching structure 310 is engaged, when forming the frame 100 by the injection molding, in addition to the use of a female mold kernel 10 and a male mold kernel 20, a slider 30 is also required. The slider 30 can make a reciprocating motion in the direction of the arrow illustrated in FIG. 2A so as to form the frame 100. However, during the injection molding process, burrs are easily to be generated at junctions A and B of the slider 30 and the male mold kernel 20, and the burrs cannot be avoided by designing a rounding corner at the parting surface or by other means. Moreover, the back plate 300 and the matching structure 310 on the back plate 300 are formed by a stamping process, and burrs are easily to be generated at the corners or the tip end (for example, the end point C illustrated in FIG. 2B) during the stamping process. In this way, upon the matching structure 310 being engaged with the frame 100, referring to FIG. 2B, the tip end of the frame 100 and the tip end of the matching structure 310 may be scraped. For example, the tip end B of the frame 100 and the tip end C of the matching structure 310 may be scraped, resulting in the generation of debris, which will fall into the backlight assembly. It is difficult to find the above-mentioned debris in a conventional inspection, but after a vibration occurs during transportation, the above-mentioned debris may move into a screen of the backlight assembly, causing display failure on the display screen.

An aspect of the present disclosure provides a frame structure applicable to a backlight assembly, so that the backlight assembly has a thinner thickness and a lighter weight, and can effectively prevent the generation of debris in the engagement process and improve the display quality of a display device.

Figure 3:
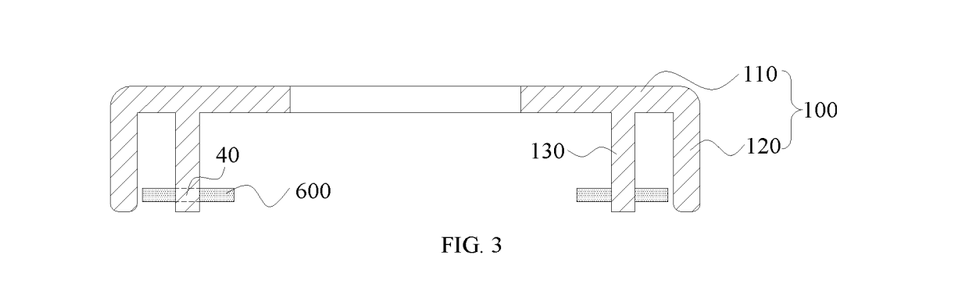
FIG. 3 is a schematic structural view of a frame structure according to an embodiment of the present disclosure.

According to an embodiment of the present disclosure, referring to FIG. 3, a frame structure includes: a frame 100 and a matching plate 600. The frame 100 includes an annular bottom 110 and a sidewall 120 surrounding the annular bottom 110. The annular bottom 110 has a projection 130 disposed in parallel with the sidewall 120. The matching plate 600 has a first hollow portion 40 matched with the projection 130. The matching plate 600 and the frame 100 are engaged with each other. Components of the frame structure of the present disclosure will be schematically illustrated by several specific embodiments. Those skilled in the art should understand that the frame structure of the present disclosure is not limited to these specific embodiments.

According to an embodiment of the present disclosure, the annular bottom 110 of the frame 100 includes a protrusion 130, and the matching plate 600 includes a first hollow portion 40 matched with the protrusion 130. In this way, the matching plate can be fixed on the frame by the first hollow portion engaged with the protrusion, so as to achieve an engagement between the matching plate and the frame. According to the embodiment of the present disclosure, the frame 100 includes an annular bottom 110, a sidewall 120, and a protrusion 130; thus, the frame has a simple structure, can be formed with a simple mold, and would not generate burrs. For example, referring to FIG. 4, when forming the frame 100 by an injection molding process, only a male mold kernel 20 and a female mold kernel 10 are used to form a mold cavity having the same shape as the frame 100, and corners of the mold cavity are located inside the male mold kernel 20 (for example, the corners D and E illustrated in FIG. 4) or located inside the female mold kernel 10 (for example, the corner F illustrated in FIG. 4); that is, the corners of the mold cavity are not located at the junctions of the two molds. Therefore, no burrs would be generated during the injection molding process, and no debris would be generated when the matching plate is engaged with the frame.

Figure 5:
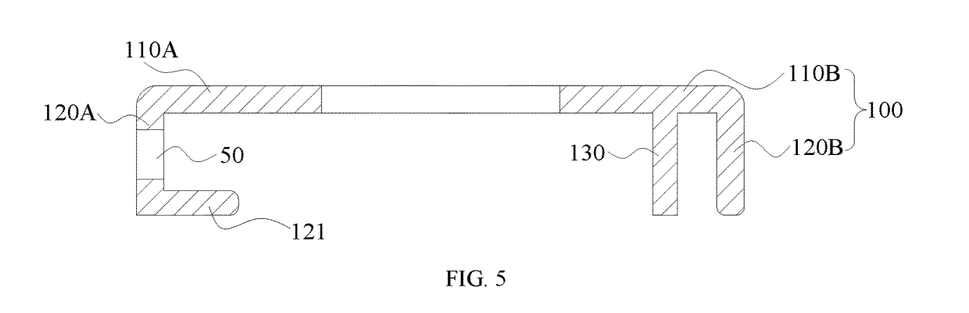
FIG. 5 is a schematic structural view of a frame according to an embodiment of the present disclosure.

According to an embodiment of the present disclosure, referring to FIG. 5, the sidewall 120 of the frame 100 includes a first sidewall 120A having a second hollow portion 50 and a bent portion 121 disposed in parallel with the annular bottom 110. The protrusion 130 is located on a portion of the annular bottom 110 that is not directly connected to the first sidewall 120A having the second hollow portion 50. For example, still referring to FIG. 5, the annular bottom 110 includes a first portion 110A directly connected to the first sidewall 120A and a second portion 110B not directly connected to the first sidewall 120A. The first portion 110A is not provided with a protrusion 130. The second portion 110B is provided with a protrusion 130. Therefore, in the case where the frame structure is applied to a backlight assembly, a light bar can be attached to the first sidewall provided with the second hollow portion, and light emitted by the light bar is irradiated onto an optical film unit in the backlight assembly through the second hollow portion, so as to achieve the use of the backlight assembly; the portion of the annular bottom directly connected to the first sidewall having the second hollow portion is not provided with a protrusion, which can prevent light emitted from the light bar disposed on the first sidewall having the second hollow portion from being shielded by a protrusion, so as to make full use of the light emitted from the light bar. Moreover, because the portion of the annular bottom directly connected to the first sidewall having the second hollow portion is not provided with a protrusion and the first sidewall having the second hollow portion is provided with a bent portion parallel to the annular bottom, the bent portion can be utilized to play a fixing effect on the optical film unit disposed at the first sidewall.

Figure 6:
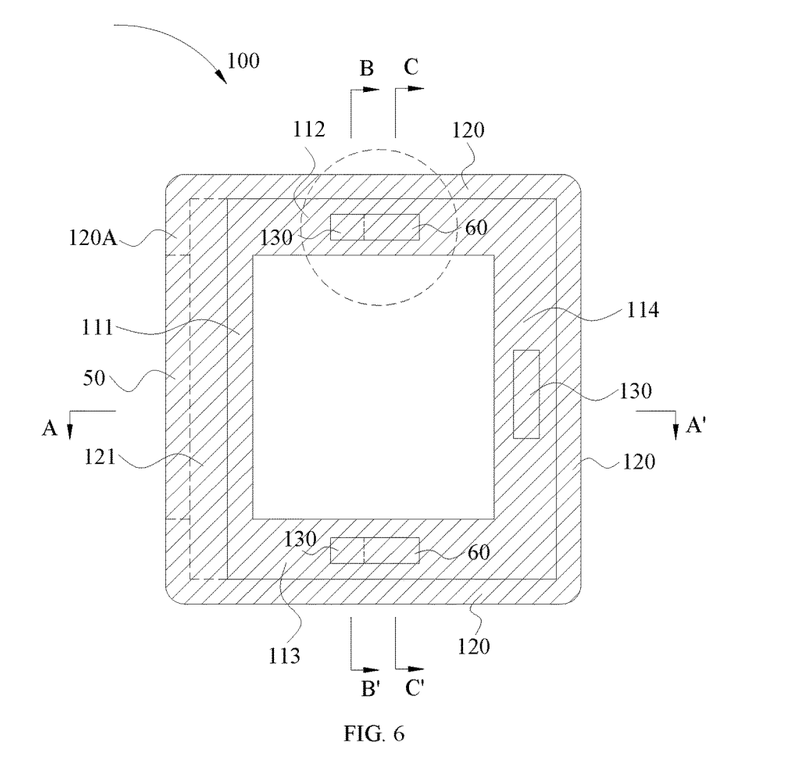
FIG. 6 is a top view of a frame according to an embodiment of the present disclosure.

It should be noted that, according to the embodiment of the present disclosure, the first sidewall 120A having the bent portion 121 further has a second hollow portion 50, and the second hollow portion 50 is located inside the first sidewall 120A (as illustrated in FIG. 6). That is to say, the second hollow portion 50 is not disposed at an edge of the first sidewall 120A. Therefore, when forming the first sidewall 120A by an injection molding process, it needs to form the second hollow portion 50 by means of a slider. Although the frame structure in the present embodiment utilizes a slider to form the sidewall like the frame structure illustrated in FIG. 1, no debris would be generated because, unlike the situation of FIG. 2A and FIG. 2B, the first sidewall 120A is not to be engaged with the matching plate 600, and the display quality of the display device to which the frame is applied will not be affected.

Figure 7:
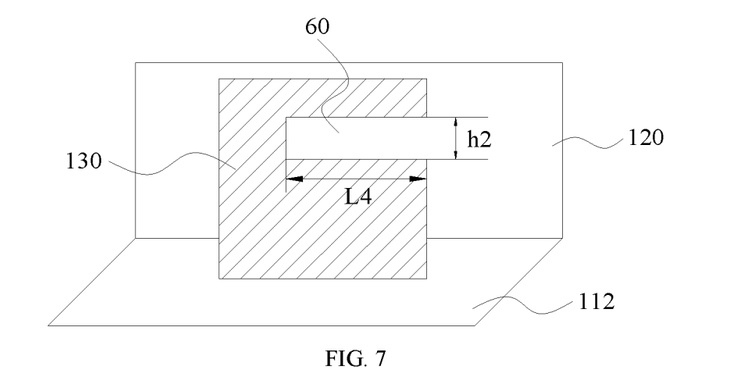
FIG. 7 is an enlarged view of a portion indicated by a circle drawn in dashed line of FIG. 6.

In an example, referring to FIG. 6, the annular bottom 110 has a rectangular annular shape, and has four sides 111-114. A first side 111 is connected to the first sidewall 120A having the second hollow portion 50; a second side 112 and a third side 113 are adjacent to the first side 111, respectively; and a fourth side 114 is opposite to the first side 111. Three sides 112-114 of the annular bottom 110 (i.e., the sides excluding the first side 111) each include a protrusion 130. The protrusions 130 on the second side 112 and the third side 113 adjacent to the first side 111 each have a notch 60 (as illustrated in FIG. 7), whereby the frame can be engaged with the matching plate through the notch on the protrusion. For example, opening directions of the notches 60 are the same with each other, to ensure that the matching plate can be engaged in the same direction. For another example, the same opening direction of the notches 60 is an extending direction of the second side 112 and the third side 113, so that the matching plate can be engaged in a direction parallel to the annular bottom to constitute the frame structure.

Figure 8A:
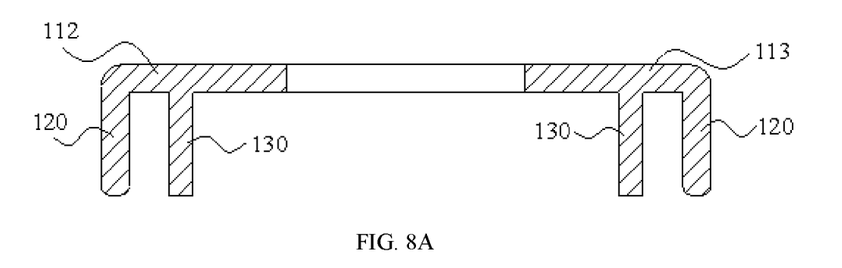
FIG. 8A and FIG. 8B illustrate cross-sectional views of the frame taken along a B-B' line and a C-C' line in FIG. 6, respectively.
Figure 8B:
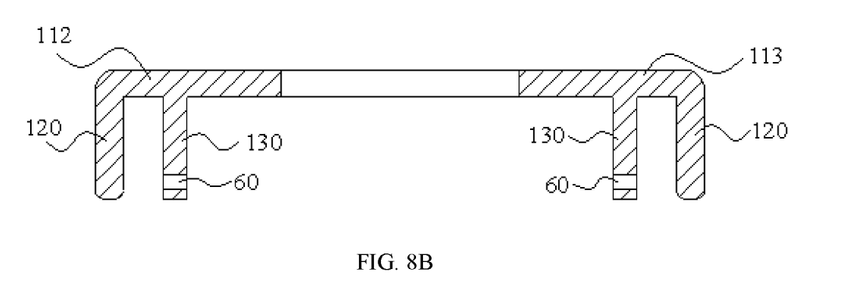

FIG. 5 is a cross-sectional view of the frame 100 of FIG. 6 taken along line A-A'. As illustrated in FIGS. 5-6, the aforementioned first portion 110A of the annular bottom is the first side 111 of the annular bottom, which is directly connected to the first sidewall 120A having the second hollow portion 50; The second portion 110B opposite to the first portion 110A is the fourth side 114 of the annular bottom, on which the protrusion 130 is disposed. FIGS. 8A-8B are cross-sectional views of the frame 100 of FIG. 6 taken along line B-B' and line C-C', respectively. As illustrated in FIGS. 8A-8B, the second side 112 and the third side 113 adjacent to the first side 111 of the annular bottom 110 each include a protrusion 130, and the protrusions 130 on the two sides each have a notch 60. In this way, the matching plate can be engaged with the protrusion through the notch in the protrusion, so that the matching plate and the frame remain fixed in a direction from the frame to the matching plate (i.e., the direction of the frame facing towards the matching plate).

Figure 4:
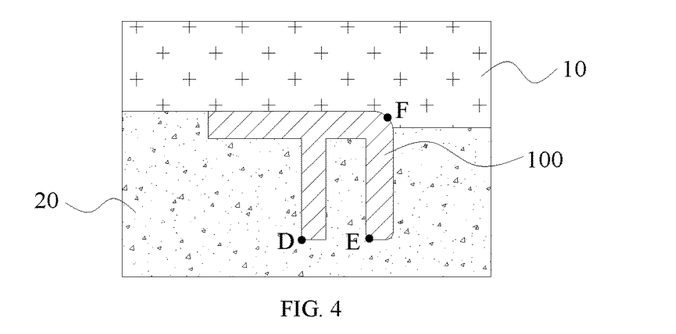
FIG. 4 is a schematic structural view of a frame forming mold according to an embodiment of the present disclosure.

It should be noted that, according to an embodiment of the present disclosure, the protrusion 130 is provided with a notch 60, and the notch 60 is disposed at an edge of the protrusion 130 (as illustrated in FIG. 7), thus the frame 100 including the protrusion 130 provided with the notch 60 can still be formed by using only a male mold kernel 20 and a female mold kernel 10 (as illustrated in FIG. 4). At this time, it only needs to form a boss having a shape of the notch 60 in a mold cavity of the male mold kernel 20 for forming the projection 130; that is to say, corners of the mold cavity for forming the frame 100 including the notch 60 are not located at the junctions of the two molds, so that no burrs would be generated during the injection molding process. Therefore, when the matching plate is engaged with the frame having the notch, no debris would be generated, and the display quality of a display device to which the frame is applied would not be affected.

Figure 9:
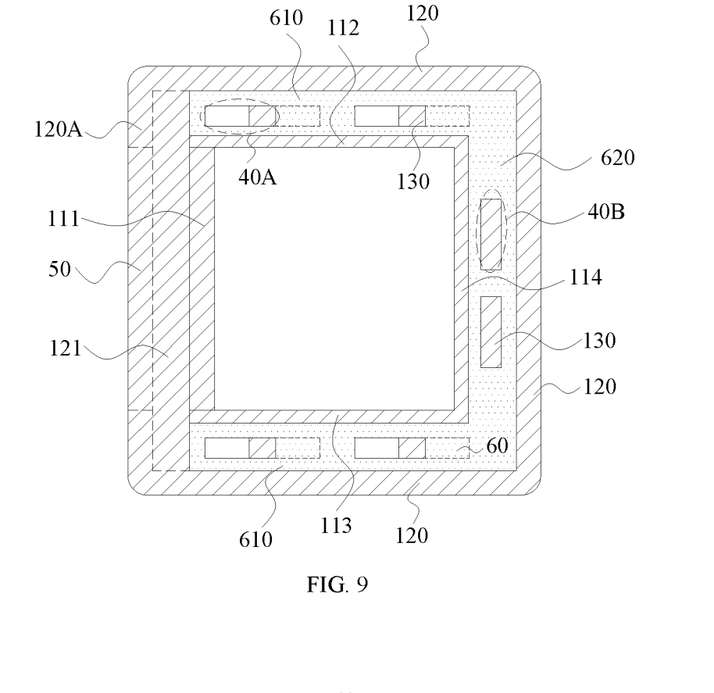
FIG. 9 is a plan view of a frame structure according to an embodiment of the present disclosure.

In an example, referring to FIG. 9, the matching plate 600 may be a U-shaped matching plate, and an opening of the U-shaped matching plate is configured to face the first sidewall 120A having the second hollow portion 50. In this way, the engagement between the matching plate and the frame can be achieved by the engagement between the matching plate and the annular bottom provided with the protrusion. Moreover, the U-shaped matching plate can further reduce the weight of the entire backlight assembly as compared with a matching plate having a closed shape such as a rectangular shape, a circular shape, or the like.

Still referring to FIG. 9, in an example, the U-shaped matching plate has two lateral edges 610 and one bottom edge 620, each of the lateral edges 610 and the bottom edge 620 has a first hollow portion. The first hollow portions 40A on the lateral edges 610 are matched with the protrusions 130 on the second side 112 and the third side 113 of the annular bottom 110, respectively; and the first hollow portion 40B on the bottom edge 620 is matched with the projection 130 on the fourth side 114 of the annular bottom 110. This is favorable for the engagement between the matching plate and the frame.

Figure 10:
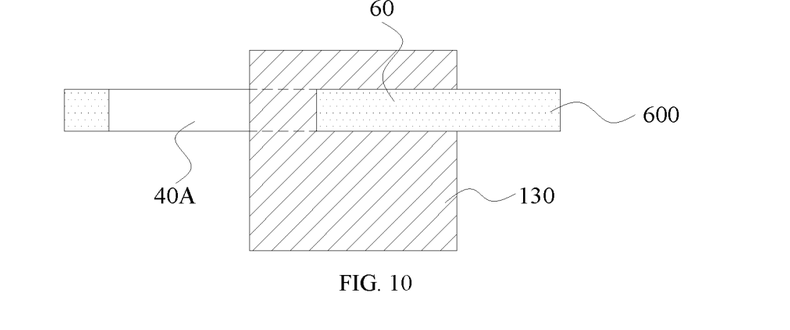
FIG. 10 is a schematic structural view illustrating an engagement between a matching plate and a protrusion according to an embodiment of the present disclosure.

Referring to FIGS. 9-10, in an example, each of the sides 112-114 of the rectangular annular bottom 110 except the first side 111 has a plurality of protrusions 130, and the first hollow portions 40A on the lateral edges 610 of the U-shaped matching plate are engaged with the notches 60 on the second side 112 and the third side 113 (as illustrated in FIG. 10), respectively. In this way, the frame and the matching plate having been engaged with each other can remain fixed in a direction from the annular bottom to the matching plate (i.e., the direction of the annular bottom facing towards the matching plate). According to an embodiment of the present disclosure, the first hollow portion 40B at the bottom edge 620 of the U-shaped matching plate is sleeved onto the protrusion 130 of the fourth side 114 opposite to the first side 111. In this way, the frame and the matching plate having been engaged with each other can remain fixed in a direction parallel to the annular bottom.

According to the embodiments of the present disclosure, the second side and the third side of the annular bottom are engaged with the matching plate by means of the protrusion having the notch, so that the frame and the matching plate can be fixed in the direction from the frame to the matching plate (i.e., the direction of the frame facing towards the matching plate). Moreover, the first hollow portion on the bottom edge of the U-shaped matching plate is sleeved onto the protrusion of the fourth side of the annular bottom, so that the frame and the matching plate can maintain as being fixed in a direction parallel to the annular bottom. Additionally, the first sidewall having the second hollow portion in the frame has a bent portion disposed in parallel with the annular bottom, and the bent portion can ensure that the frame structure remains fixed at the first sidewall. In this way, it is ensured that the frame has good stability on each side.

According to the embodiment of the present disclosure, in the case where the annular bottom is provided with a plurality of protrusions on each of the sides except the first side, the arrangement of the plurality of protrusions is not particularly limited as long as the engagement between the frame and the matching plate can be realized. Those skilled in the art can design according to specific conditions. For example, the plurality of protrusions may be arranged in a straight line or a fold line along an extending direction of each of the sides, and the corresponding first hollow portions on the matching plate are also arranged in a straight line or in a fold line, so as to be matched with the corresponding protrusions to complete the engagement.

In the embodiment of the present disclosure, the shape of the protrusion is not particularly limited as long as the engagement between the frame and the matching plate can be achieved, and those skilled in the art can design according to the specific conditions. For example, the protrusion may have a rectangular parallelepiped shape, a triangular shape, a square shape, or the like, and the shape of the corresponding first hollow portion on the matching plate also has a rectangular parallelepiped shape, a triangular shape, a square shape, etc., respectively, to be matched with the corresponding protrusion, so as to complete the engagement.

In the embodiment of the present disclosure, the number and the size of the protrusions are not particularly limited as long as the engagement between the matching plate and the frame can be achieved, and the annular bottom and the sidewalls can be matched as described above. Those skilled in the art can design according to the specific conditions.

Figure 11A:
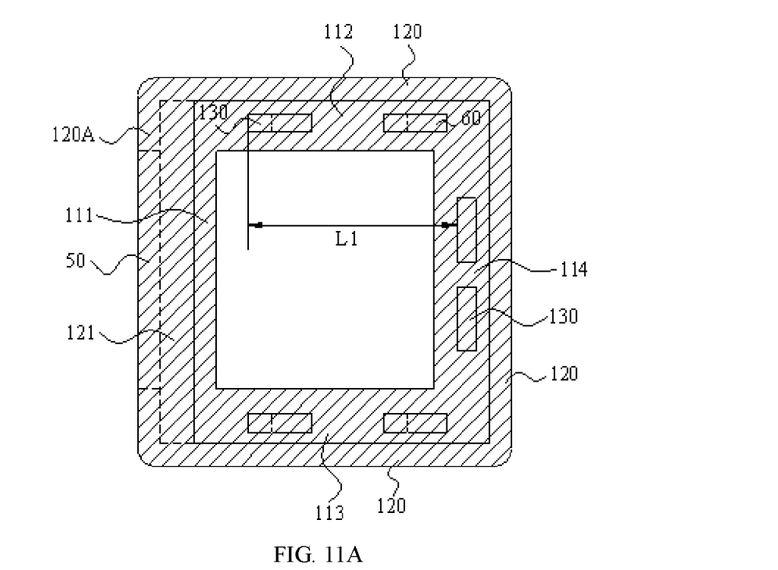
FIG. 11A and FIG. 11B are plan views of a frame structure according to an embodiment of the present disclosure.
Figure 11B:
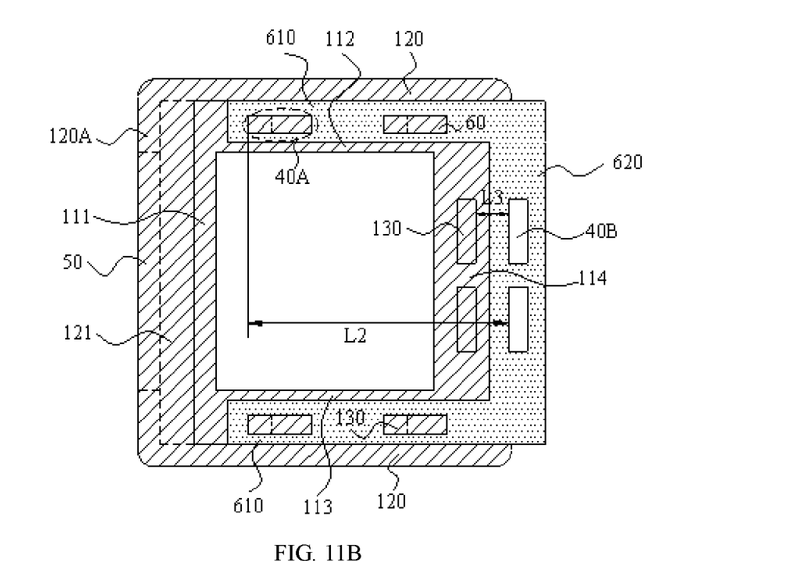

According to an embodiment of the present disclosure, during engaging the matching plate 600 with the frame 100, firstly, the first hollow portions 40A on the two lateral edges 610 of the matching plate 600 are placed to correspond to the protrusions 130 on the second side 112 and the third side 113 of the annular bottom 110, respectively, that is, the matching plate 600 is disposed opposite to the frame 100 in such a manner that orthographic projections of the first hollow portions 40A on the two lateral edges 610 of the matching plate 600 on the annular bottom 110 cover the protrusions 130 on the second side 112 and the third side 113 (as illustrated in FIG. 11B) respectively; subsequently, the first hollow portions 40A on the two lateral edges 610 of the matching plate 600 are sleeved onto the protrusions 130 on the second side 112 and the third side 113 of the annular bottom 110 respectively; subsequently, the matching plate 600 is pulled to move along a direction from the fourth side 114 to the first side 111 of the annular bottom 110, or the matching plate 600 is pulled to move along a direction from the first side 111 to the fourth side 114 of the annular bottom 110, such that the two lateral edges 610 of the matching plate 600 are engaged with the notches 60 of the protrusions 130 of the second side 112 and the third side 113 of the annular bottom 110 respectively, and the first hollow portion 40B on the bottom edge 620 of the matching plate 600 is sleeved onto the projection 130 of the fourth side 114 of the annular bottom 110 at the same time. The frame structure as obtained after the engagement between the matching plate 600 and the frame 100 is as illustrated in FIG. 9. In this way, the engagement between the matching plate and the frame is achieved.

According to an embodiment of the present disclosure, the thickness of the matching plate 600 is not greater than the height of the notch 60 in the protrusion 130 (h2 as illustrated in FIG. 7), so as for engaging the matching plate with the notch, thereby implementing the engagement between the matching plate and the frame.

According to an embodiment of the present disclosure, referring to FIG. 11A, in an extending direction of the second side 112 of the annular bottom 110, the protrusion 130 on the second side 112 and the third side 113 located closer to the first side 111, and the protrusion 130 on the fourth side 114, have a distance L1 there-between. Referring to FIG. 11B, during engaging the matching plate 600 with the frame 100, as described above, firstly, the first hollow portions 40A on the two lateral edges 610 of the matching plate 600 are sleeved onto the protrusions 130 on the second side 112 and the third side 113 of the annular bottom 110, respectively. In this case, in an extending direction of the second side 112 of the annular bottom 110, the first hollow portion 40A on the two lateral edges 610 of the matching plate 600 closer to the first sidewall 120A having the second hollow portion 50, and the first hollow portion 40B on the bottom edge 620 of the matching plate 600, has a distance L2 therebetween; and the first hollow portion 40B on the bottom edge 620 and the protrusion 130 on the fourth side 114 of the annular bottom 110 has a distance L3 therebetween. In the case where an opening direction of the notch 60 faces the fourth side 114 of the annular bottom 110, L2=L1+L3; in the case where the opening direction of the notch 60 faces the first side 111 of the annular bottom 110, L2=L1−L3.

According to an embodiment of the present disclosure, referring to FIG. 9 and FIG. 11B, upon the first hollow portions 40A on the two lateral edges 610 of the matching plate 600 being engaged with the notches 60, respectively, and upon the first hollow portion 40B on the bottom edge of the matching plate 600 being sleeved onto the protrusion 130 of the fourth side 114 of the annular bottom 110 (as illustrated in FIG. 9), a distance that the matching plate 600 moves in the extending direction of the second side 112 of the annular bottom 110 is L3, and a maximum distance that the matching plate 600 can move in the extending direction of the second side 112 is the length of the notch 60 (L4 as illustrated in FIG. 7), that is, L3≤L4. Thus, in the case where the opening direction of the notch 60 faces the fourth side 114, L1<L2≤L1+L4, and in the case where the opening direction of the notch 60 faces the first side 111, L1−L4≤L2<L1. Therefore, the distance between the first hollow portions on the lateral edges and the bottom edge of the matching plate can be obtained according to the distance between the protrusions on the second side and the fourth side of the annular bottom, as well as the length of the notch, so as to obtain dimension parameters related to the matching plate engaged with the frame.

Another aspect of the present disclosure provides a backlight assembly including the frame structure described in any of the abovementioned embodiments or examples. Thus, the backlight assembly has all the features and advantages of the frame structure described above, and details are omitted herein. In general, the backlight assembly has smaller thickness and weight, and can effectively avoid the generation of the debris and improve the display quality of display device.

According to an embodiment of the present disclosure, the backlight assembly utilizes the above-described protrusion on the frame to achieve the engagement with the matching plate, which saves a back plate and a matching structure on the back plate in the backlight assembly illustrated in FIG. 1-2. In this way, the weight of the backlight assembly is significantly reduced; and no debris would be generated during the engagement by using the frame and the matching plate as described above, thereby improving the display quality of the display device to which the backlight assembly is applied. The principle that no debris is generated upon the frame and the matching plate being engaged with each other has been described in detail above and will not be repeated herein.

According to an embodiment of the present disclosure, referring to FIG. 12, the backlight assembly includes a frame 100, an optical film unit 200, a light bar 400, and a matching plate 600. A first sidewall 120A of the frame 100 has a second hollow portion 50 and a bent portion 121; the light bar 400 is attached to an outer side of the first sidewall 120A by a fixing tape 500, which facilitates the assembly of the light bar. The protrusion 130 is only disposed on a portion of the annular bottom 110 that is not connected to the first sidewall 120A, that is, a portion of the annular bottom that is connected to the first sidewall to which the light bar is attached is not provided with a protrusion, thereby preventing light emitted by the light bar from being shielded by the protrusion; the sidewall of the frame 100 not provided with the second hollow portion 50 (for example, 120B, 120C, 120D) each has a notch 70 on a side away from the annular bottom 110. Moreover, the matching plate 600 extends into the notch 70, thereby preventing light leakage and improving the utilization of light emitted by the light bar.

Figure 12A:
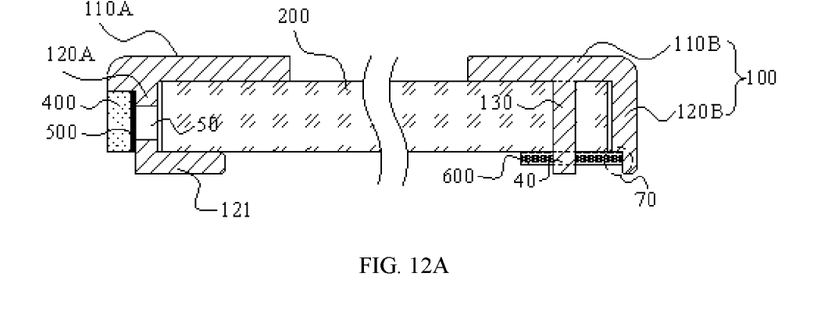
FIG. 12A and FIG. 12B are schematic structural views of a backlight assembly according to an embodiment of the present disclosure.

According to an embodiment of the present disclosure, referring to FIG. 12A, the first portion 110A of the annular bottom 110 provided with the light bar 400 may extend along a direction away from the first sidewall 120A, and the extending portion is matched with the light bar 400, such that the light bar 400 is fixed to an area formed by the extending portion and the first sidewall 120A to ensure the fixing stability of the light bar.

According to an embodiment of the present disclosure, referring to FIG. 12, the annular bottom 110 has four sides 111-114, the first side 111 is connected to the first sidewall 120A, and the second side 112 and the third side 113 are both adjacent to the first side 111, the fourth side 114 is disposed opposite to the first side 111. Three sides 112-114 of the annular bottom 110 (i.e., the sides excluding the first side 111) each have a protrusion 130. That is to say, in the frame 100, the second portion 110B (i.e., the fourth side 114), the third portion 110C (i.e., the second side 112), and the fourth portion 110D (i.e., the third side 113) of the annular bottom 110, being not connected to the first sidewall 120A, each include a protrusion 130; the protrusion 130 on the second side 112 and the protrusion 130 on the third side 113 each have a notch 60, the opening directions of the notches 60 may be the same with each other, and the same opening direction may be the extending direction of the second side 112 and the third side 113.

Figure 13:
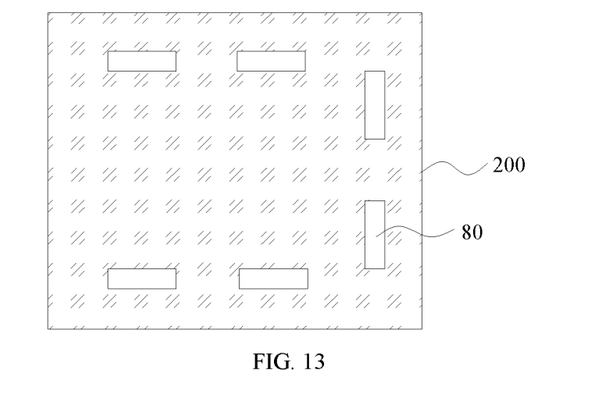
FIG. 13 is a plan view of an optical module according to an embodiment of the present disclosure.

With further reference to FIG. 13, the optical film unit 200 has a third hollow portion 80 matched with the protrusion 130, and a side of the optical film unit 200 that is not provided with the third hollow portion 80 is close to the first sidewall 120A provided with the second hollow portion 50. By means of the third hollow portion 80 and the projection 130, the optical film unit 200 can be fixed between the annular bottom 110 and the matching plate 600, whereby the fixation of the optical film unit in a direction parallel to the annular bottom can be achieved.

Figure 12B:
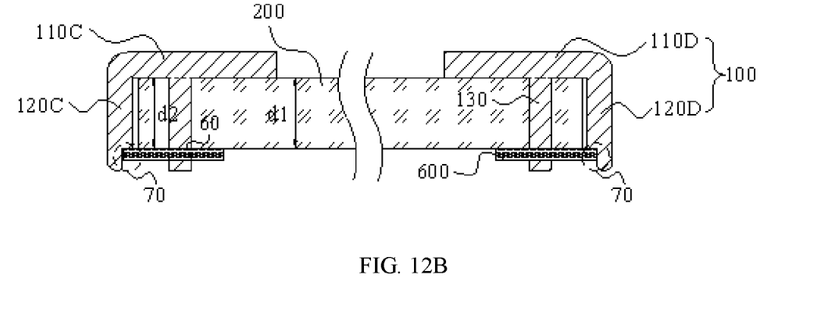

According to an embodiment of the present disclosure, referring to FIG. 12B, it is assumed that the thickness of the optical film unit 200 is d1, and the vertical distance between a side of the notch 60 close to the annular bottom 110 and the annular bottom 110 is d2, then d1 is matched with d2, for example, d1=d2. In this way, the fixation of the optical film unit in the direction of the annular bottom facing towards the matching plate can be achieved.

According to an embodiment of the present disclosure, the optical film unit 200 may include an optical film, a light guide plate, and a reflective sheet which are sequentially stacked, and the optical film is disposed close to the annular bottom, whereby the use function of the backlight assembly can be achieved. According to an embodiment of the present disclosure, the optical film unit 200 has a third hollow portion 80 matched with a protrusion 130 on the annular bottom 110; that is, the optical film, the light guide plate, and the reflective sheet each include a third hollow portion matched with the protrusion, so as to facilitate the assembly and fixation of the above components.

Figure 2B:
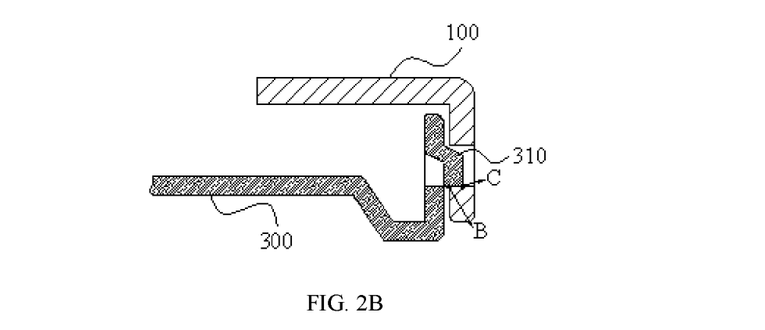

According to an embodiment of the present disclosure, referring to FIG. 12, the overall thickness of the backlight assembly is a sum of the thicknesses of the annular bottom 110 and the thicknesses of the protrusion 130, while the thickness of the protrusion 130 is determined by the thickness of the optical film unit 200 and the thickness of the matching plate 600. For example, assuming that a distance between the notch 60 in the protrusion 130 and the annular bottom 110 is d2, the distance d2 is determined by the thickness d1 of the optical film unit 200. The thickness of the matching plate 600 is not greater than the height of the notch 60. In order to further reduce the thickness of the backlight assembly, the height of the notch 60 may be set to be as same as the thickness of the matching plate 600. The thickness of the matching plate 600 in the embodiment of the present disclosure may be equal to the thickness of the back plate in the backlight assembly illustrated in FIGS. 1-2, for example, may be 0.8 mm, whereby the height of the notch 60 can be determined. According to an embodiment of the present disclosure, the thickness of a portion of the protrusion 130 on a side of the notch 60 away from the annular bottom 110 may be configured such that the matching plate 600 remains fixed in a direction from the annular bottom to the matching plate (i.e., the direction of the annular bottom facing towards the matching plate). Based on this, those skilled in the art can select a suitable thickness, as small as possible, for this portion. Then, the thickness of the other portions of the projection 130 can be determined. Because the overall thickness of the backlight assembly is a sum of thicknesses of all the components, and because the embodiment of the present disclosure eliminates the thickness (about 1.5 mm) of the arched portion of the back plate (h1 as illustrated in FIG. 2A and FIG. 2B), the thickness of the backlight assembly of the embodiment of the present disclosure is remarkably reduced, and has the advantage of smaller thickness and weight, which is favorable for the development of a thinner and lighter display device.

In order to facilitate understanding of the structure and function of the backlight assembly provided by the embodiments of the present disclosure, the assembly process of the backlight assembly is schematically illustrated below.

Figure 14A:
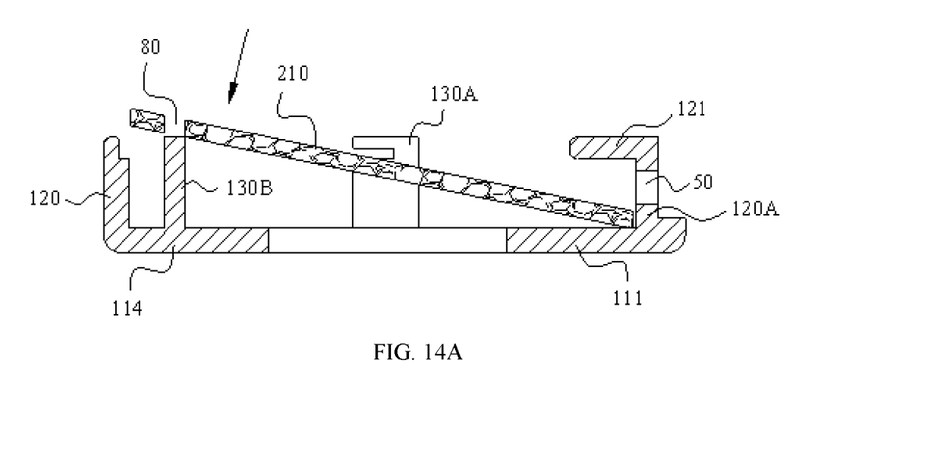
FIG. 14A, FIG. 14B and FIG. 14C are schematic views illustrating an assembling process of a backlight assembly according to an embodiment of the present disclosure.
Figure 14B:
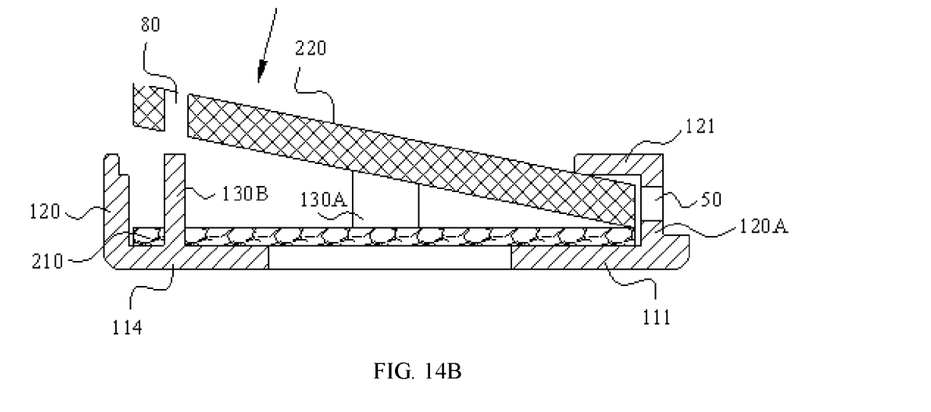
Figure 14C:
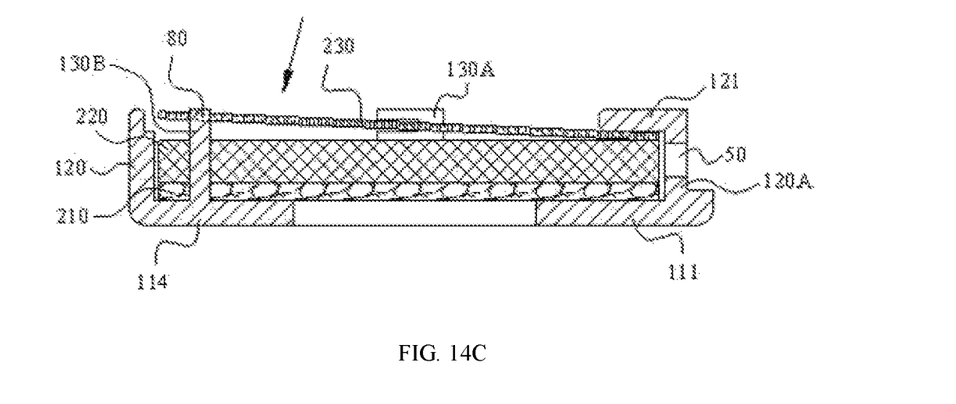

According to an embodiment of the present disclosure, referring to FIG. 14, the backlight assembly is assembled in a reversed manner. For example, referring to FIG. 14A, firstly, the optical film 210 is disposed in the frame 100 in such a manner that the third hollow portions 80 of the optical film 210 are sleeved onto the protrusion (not illustrated) on the second side 112 (not illustrated), the protrusion 130A on the third side 113 (not illustrated), and the protrusion 130B on the fourth side 114 of the annular bottom 110, respectively. Subsequently, referring to FIG. 14B, the light guide plate 220 is disposed on a side of the optical film 210 away from the annular bottom 110 in such a manner that the third hollow portions 80 of the light guide plate 220 are sleeved onto the protrusion (not illustrated) on the second side 112 (not illustrated), the protrusion 130A on the third side 113 (not illustrated), and the protrusion 130B on the fourth side 114, respectively. Subsequently, referring to FIG. 14C, the reflective sheet 230 is disposed on a side of the light guide plate 220 in the frame 100 away from the optical film 210 in such a manner that the third hollow portions 80 of the reflective sheet 230 are sleeved onto the protrusion (not illustrated) on the second side 112 (not illustrated), the protrusion 130A on the third side 113 (not illustrated), and the protrusion 130B on the fourth side 114, respectively. In this case, a sum of the thickness of the optical film 210, the thickness of the light guide plate 220, and the thickness of the reflective sheet 230 is equal to the vertical distance between the notch 60 of the protrusion 130 and the annular bottom 110.

Figure 15A:
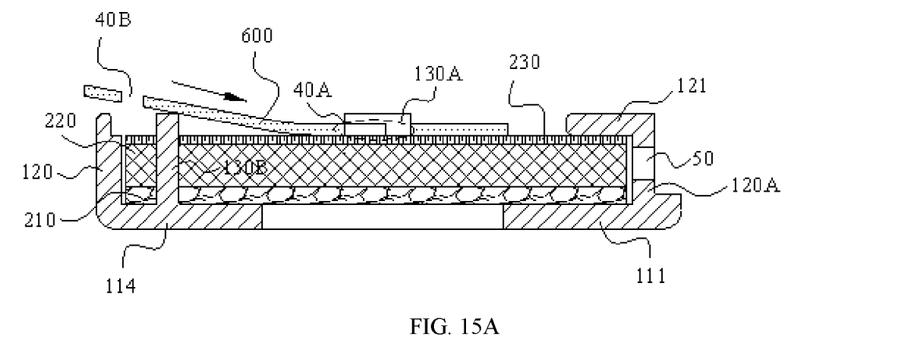
FIG. 15A, FIG. 15B and FIG. 15C are schematic views illustrating an assembling process of another backlight assembly according to an embodiment of the present disclosure.
Figure 15B:
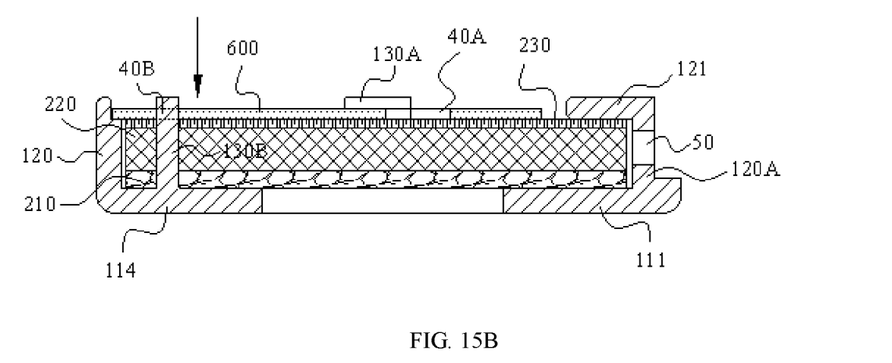
Figure 15C:
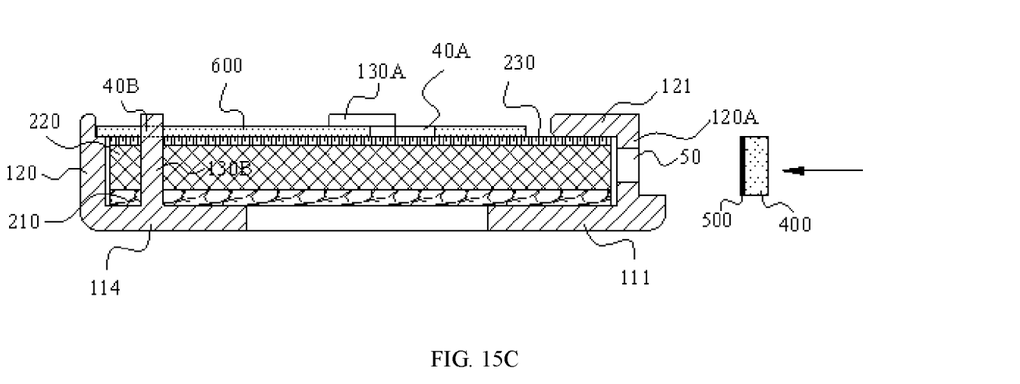

Subsequently, referring to FIG. 15A, the first hollow portions 40A of the two lateral edges of the matching plate 600 are sleeved onto the protrusion (not illustrated) and the protrusion 130A of the third side 113, respectively, and the matching plate 600 is pulled to move along the extending direction of the third side 113 (i.e., the side where the projection 130A is located). Subsequently, referring to FIG. 15B, after the matching plate 600 is engaged with the notch 60 in the protrusion 130A, the first hollow portion 40B on the bottom edge of the matching plate 600 is sleeved onto the protrusion 130B of the fourth side 114. Finally, referring to FIG. 15C, the light bar 400 is attached to an outer side of the first sidewall 120A provided with the second hollow portion 50 to complete the assembly of the backlight assembly. In this way, a backlight assembly having smaller thickness and weight can be obtained, and the backlight assembly would not generate debris from engagement during assembly, and the display quality of the display device to which the backlight assembly is applied can be improved.

Further another aspect of the present disclosure provides a display device including the backlight assembly described in any of the abovementioned embodiments or examples. Thus, the display device has all of the features and advantages of the backlight assembly described above, and will not be described herein. In general, the display device has smaller thickness and weight, and achieves higher display quality.

The above are only specific implementations of the present disclosure, and the protection scope of the present disclosure is not limited thereto. Any modifications or substitutions easily occur to those skilled in the art within the technical scope of the present disclosure should be fallen within the protection scope of the present disclosure. Therefore, the protection scope of the present disclosure should be based on the protection scope of the claims and the equivalents thereof.

The present application claims priority of China Patent application No. 201821790804.6 filed on Oct. 31, 2018, the content of which is incorporated in its entirety as portion of the present application by reference herein.

What is claimed is:

1. A frame structure, comprising:
   a frame comprising an annular bottom and a sidewall surrounding the annular bottom, the annular bottom having a protrusion disposed in parallel with the sidewall; and
   a matching plate having a first hollow portion, wherein the first hollow portion is configured to be engaged with the protrusion,
   wherein the sidewall of the frame comprises a first sidewall, the first sidewall has a second hollow portion and a bent portion, the bent portion is disposed in parallel with the annular bottom, and
   the projection is located on a portion of the annular bottom that is not connected to the first sidewall,
   wherein the annular bottom is a rectangular annular bottom having a first side, a second side and a third side both adjacent to the first side, and a fourth side opposite to the first side,
   the first side is connected to the first sidewall,
   the second side, the third side and the fourth side each comprise the protrusion, and
   the protrusion on the second side and the protrusion on the third side each comprise a notch.

2. The frame structure according to claim 1, wherein the notch of the second side and the notch of the third side have a same opening direction.

3. The frame structure according to claim 2, wherein the same opening direction is an extending direction of the second side and the third side.

4. The frame structure according to claim 1, wherein the matching plate is a U-shaped matching plate, and an opening of the U-shaped matching plate faces towards the first sidewall.

5. The frame structure according to claim 1, wherein a plurality of protrusions is provided on each of the second side, the third side, and the fourth side of the annular bottom.

6. The frame structure according to claim 1, wherein the matching plate is a U-shaped matching plate having two lateral edges and a bottom edge, and the first hollow portion is disposed at each of the two lateral edges and is configured to be engaged with the notch on the second side and the notch on the third side respectively.

7. The frame structure according to claim 6, wherein the first hollow portion is further disposed at the bottom edge of the U-shaped matching plate and is configured to be engaged with the protrusion of the fourth side.

8. A backlight assembly, comprising the frame structure wherein the frame structure comprises:
   a frame comprising an annular bottom and a sidewall surrounding the annular bottom, the annular bottom having a protrusion disposed in parallel with the sidewall; and
   a matching plate having a first hollow portion, wherein the first hollow portion is configured to be engaged with the protrusion, wherein
   the sidewall of the frame comprises a first sidewall, the first sidewall has a second hollow portion and a bent portion, the bent portion is disposed in parallel with the annular bottom, and
   the projection is located on a portion of the annular bottom that is not connected to the first sidewall, and wherein
   the annular bottom is a rectangular annular bottom having a first side, a second side and a third side both adjacent to the first side, and a fourth side opposite to the first side,
   the first side is connected to the first sidewall,
   the second side, the third side and the fourth side each comprise the protrusion, and
   the protrusion on the second side and the protrusion on the third side each comprise a notch.

9. The backlight assembly according to claim 8, wherein the sidewall of the frame further comprises a second side wall being not provided with the second hollow portion, the second sidewall has a notch on a side away from the annular bottom, the matching plate extends into the notch, and
   the backlight assembly further comprises:
   a light source attached to an outer side of the first sidewall through a fixing tape.

10. The backlight assembly according to claim 9, wherein the backlight assembly further comprises:
    an optical film unit fixed between the annular bottom and the matching plate, the optical film unit has a third hollow portion, and the third hollow portion is configured to be engaged with the protrusion.

11. The backlight assembly according to claim 10, wherein the optical film unit has a thickness of d1, and
    a vertical distance between a side of the notch close to the annular bottom and the annular bottom is d2, wherein d1=d2.

12. The backlight assembly according to claim 10, wherein the notch of the second side and the notch of the third side have a same opening direction.

13. The backlight assembly according to claim 12, wherein the same opening direction is an extending direction of the second side and the third side.

14. A display device, comprising the backlight assembly wherein the backlight assembly comprises a frame structure, wherein the frame structure comprises:
 a frame comprising an annular bottom and a sidewall surrounding the annular bottom, the annular bottom having a protrusion disposed in parallel with the sidewall; and
 a matching plate having a first hollow portion, wherein
 the first hollow portion is configured to be engaged with the protrusion, wherein
 the sidewall of the frame comprises a first sidewall, the first sidewall has a second hollow portion and a bent portion, the bent portion is disposed in parallel with the annular bottom, and
 the projection is located on a portion of the annular bottom that is not connected to the first sidewall, and wherein
 the annular bottom is a rectangular annular bottom having a first side, a second side and a third side both adjacent to the first side, and a fourth side opposite to the first side,
 the first side is connected to the first sidewall,
 the second side, the third side and the fourth side each comprise the protrusion, and
 the protrusion on the second side and the protrusion on the third side each comprise a notch.

15. The display device according to claim 14, wherein
 the sidewall of the frame further comprises a second side wall being not provided with the second hollow portion, the second sidewall has a notch on a side away from the annular bottom, the matching plate extends into the notch, and
 the display device further comprises:
 a light source attached to an outer side of the first sidewall through a fixing tape.

16. The display device according to claim 15, wherein the backlight assembly further comprises:
 an optical film unit fixed between the annular bottom and the matching plate, the optical film unit has a third hollow portion, and the third hollow portion is configured to be engaged with the protrusion.

17. The display device according to claim 16, wherein the optical film unit has a thickness of d1, and
 a vertical distance between a side of the notch close to the annular bottom and the annular bottom is d2, wherein d1=d2.

18. The display device according to claim 16, wherein the notch of the second side and the notch of the third side have a same opening direction, and
 the same opening direction is an extending direction of the second side and the third side.

* * * * *